Oct. 3, 1944.  M. A. WECKERLY  2,359,720
APPARATUS FOR MEASURING FUEL CONSUMPTION
Filed June 8, 1942  3 Sheets-Sheet 1
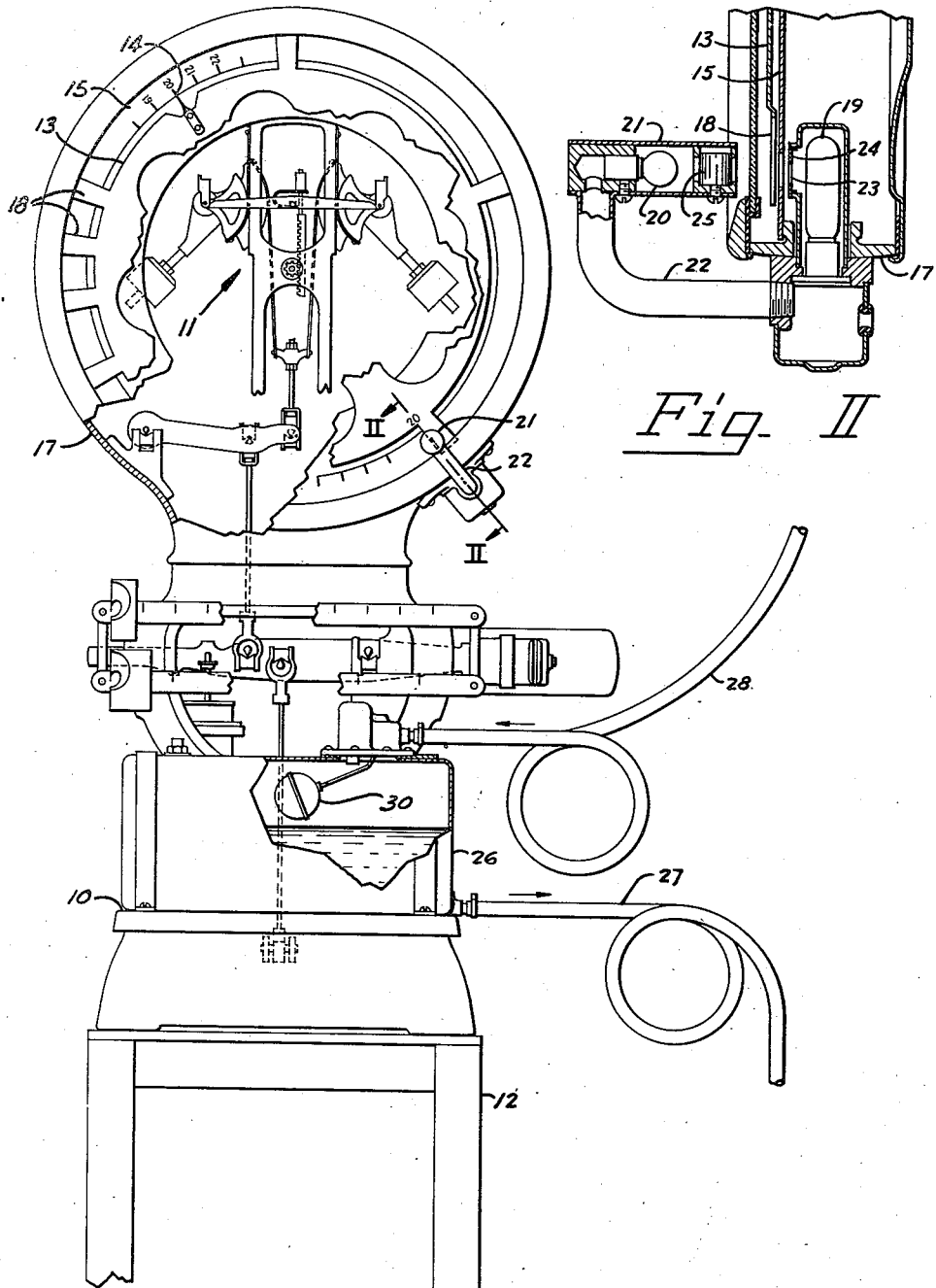
Fig. I
Fig. II
Mark A. Weckerly
INVENTOR
BY Marshall & Marshall
ATTORNEYS

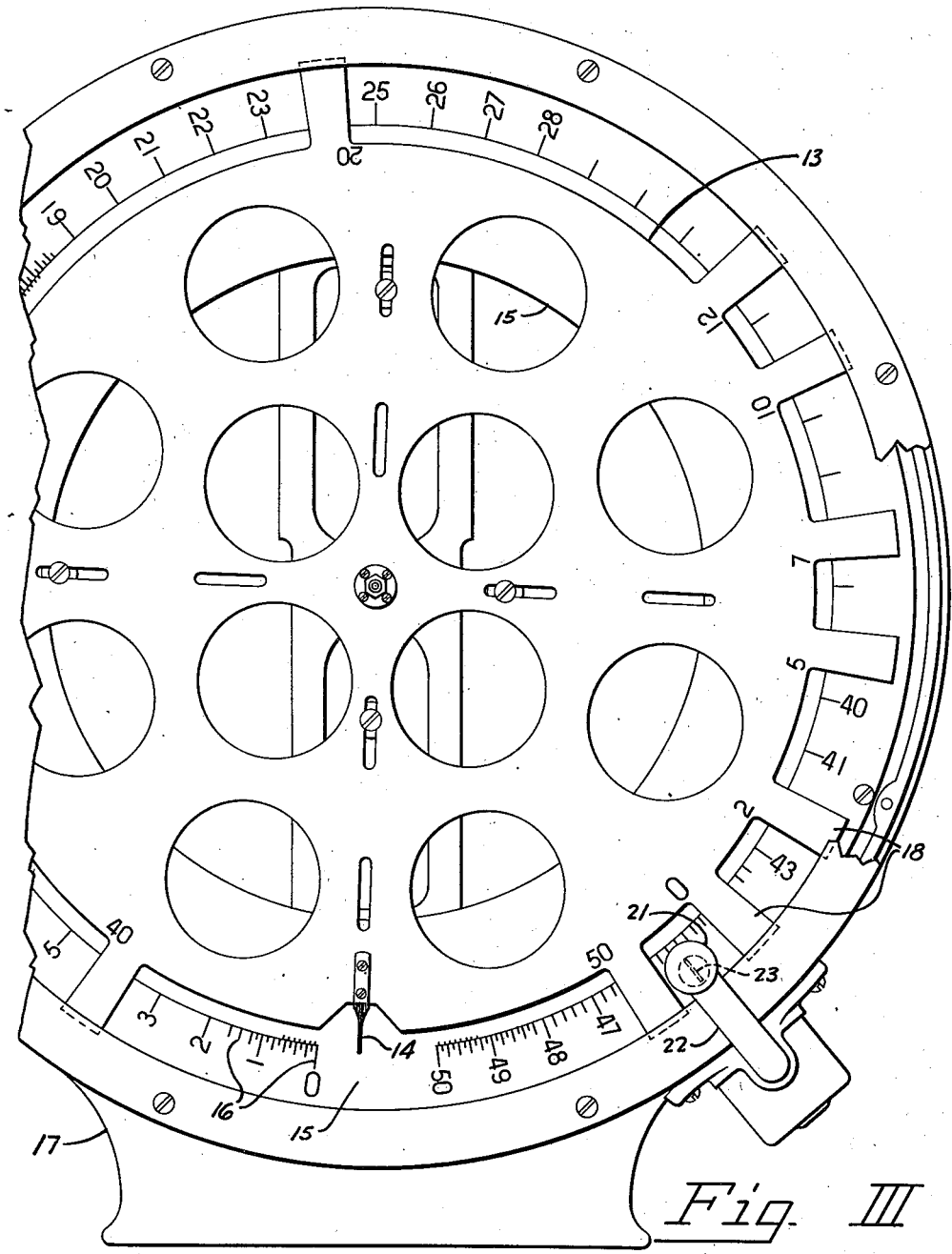

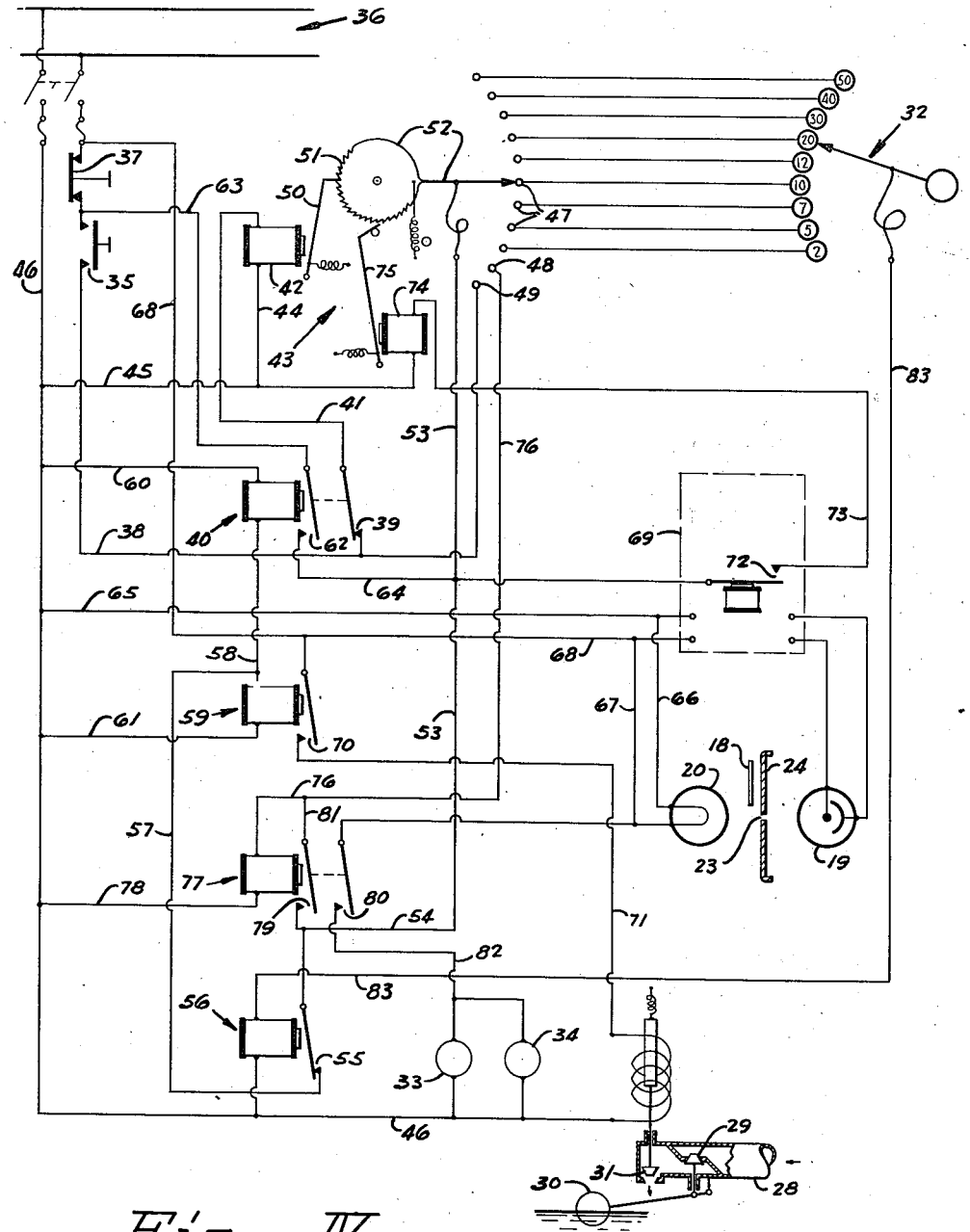
Fig. IV

Patented Oct. 3, 1944

2,359,720

UNITED STATES PATENT OFFICE 2,359,720

APPARATUS FOR MEASURING FUEL CONSUMPTION

Mark A. Weckerly, Toledo, Ohio, assignor to Toledo Scale Company, Toledo, Ohio, a corporation of New Jersey Application June 8, 1942, Serial No. 446,182

7 Claims. (Cl. 73—114)

This invention relates to apparatus for metering liquid flow, and more particularly to such an apparatus incorporating a weighing scale for controlling the measurement of the fuel consumption of internal combustion engines under test.

In testing an internal combustion engine it is necessary to determine the rate of fuel consumption of the engine over specified periods of time and also the number of revolutions of the engine resulting from the consumption of various specified quantities of fuel.

The instant invention has for its object the provision of a weighing scale which will automatically control the measurement of the flow of fuel from a supply tank and to an internal combustion engine to permit the measurement of the delivery of various specified quantities of fuel and to control the operation of a revolution counter and a chronometer for registering the number of revolutions and elapsed time of the test.

It is another object of this invention to provide a testing device for measuring fuel consumption with which the engine to be tested can be started and left running during and between successive tests and which will automatically control the measurement of fuel consumption during testing periods.

It is a further object of this invention to provide a fuel consumption testing scale which can be set to control the measurement of the feeding of varying quantities of fuel to an internal combustion motor under test.

More specific objects and advantages are apparent from the description, in which reference is had to the accompanying drawings illustrating a preferred form of scale embodying the invention.

In the drawings:

Fig. I is a front elevational view of a weighing scale embodying the invention, certain parts being broken away to more clearly illustrate the operation.

Fig. II is an enlarged fragmentary view, taken substantially on the line II—II of Fig. I.

Fig. III is an enlarged fragmentary view in elevation of the dial and control mechanism of the scale illustrated in Fig. I.

Fig. IV is a schematic wiring diagram of the electrical equipment employed with the scale illustrated in Fig. I.

A conventional weighing scale having a platform 10, which is connected to automatic load counterbalancing mechanism 11 by a lever system (not shown), may be mounted upon a stand 12. The automatic load counterbalancing mechanism 11 is so arranged as to rotate a paddle-wheel indicator 13 (see also Fig. III) in a clockwise direction upon a decrease of the load on the scale.

The paddle-wheel indicator 13 has a pointer 14 which cooperates with an annular chart 15 carrying a series of weight indicia 16 located in a watch-case shaped dial housing 17 which also houses the load counterbalancing mechanism 11 and forms the upper portion of the housing of the weighing scale.

Around the outer edge of the paddle-wheel indicator 13 there is located a series of intercepting paddles 18, each of which represents a quantity of fuel which, through an automatic control associated therewith, may be delivered to an internal combustion engine during a test. The peripheral distance between the leading edges of successive ones of the paddles 18 is equal to the distance on the chart 15 between similar ones of the indicia marks making up the series 16, i. e., the distance from the leading edge, for example, of that one of the paddles marked "0" to the leading edge of that one of the paddles marked "2" is equal to the distance from the "0" indicium in the series 16 to the "2" indicium in that series.

The load counterbalancing mechanism is designed to rotate the paddle-wheel indicator 13 in a clockwise direction as the weight on the scale decreases, thus successively moving each of the paddles 18 in front of a photoelectric cell 19 (Fig. II) which is located in the interior of the dial housing 17 and interrupting a beam of light concentrated on the elements of the cell 19 by a lamp 20 located in a housing 21 supported on the exterior of the dial housing 17 by a pipe bracket 22. A slot 23, extending on a radial line of the paddle-wheel indicator 13, is cut through a screen 24 located just in front of the photoelectric cell 19. Light from the lamp 20 is concentrated through this slot 23 on the elements of the photoelectric cell 19 by a cylindrical lens 25 mounted in the innermost end of the lamp housing 21.

A scale fuel tank 26 (Fig. I) is clamped to the platform 10 of the weighing scale. An outlet pipe 27 leads from the fuel tank 26 to the internal combustion engine under test, and an inlet pipe 28 leads from a fuel supply tank to the scale fuel tank 26. The level of fuel in the scale tank 26 is normally maintained constant by a float valve 29 (see also Fig. IV) having a float 30 extending into the scale tank 26. The float valve 29 is located betwen the inlet pipe 28 and the discharge into the scale tank 26. A solenoid controlled valve 31 is located between the float valve 29 and the discharge port into the scale tank 26.

The operation of the device is as follows: The internal combustion engine to be tested may be first started and permitted to run as long as necessary to reach its effective operating condition. Fuel for this preliminary run is fed through the fuel tank by the operation of the float valve 29 which permits fuel to enter the tank as it is required by the engine. Since the scale embodying the instant invention which is disclosed in the drawings is designed for tests of consumption up to 50 pounds of fuel, the float valve 29 is so designed that it maintains a fuel level in the scale tank 26 of enough fuel to weigh slightly more than 50 pounds.

When the operator is satisfied that the engine to be tested is operating properly, he sets a selector switch 32 to the quantity in pounds of fuel on which he desires to make a test (in Fig. IV the selector switch is shown set at the 20 pound position). With the level of fuel under the control of the float valve 29, the paddle-wheel indicator at the start of a test is positioned as illustrated in Fig. III, the pointer 14 being back of the "0" indicium because the amount of fuel on the scale is maintained at slightly more than 50 pounds. In addition to setting the selector switch 32 the operator resets an associated electrically controlled registering chronometer 33 and an electrically controlled revolution counter 34 to zero. These two devices are not shown in detail as they are standard equipment regularly incorporated for other tests besides fuel consumption. These devices, as ordinarily furnished, are adapted to measure and indicate the time interval or the number of revolutions completed by the engine during the interval that a circuit is closed. These devices may, of course, be made recording by suitable modification.

After determining that all the conditions are suitable for a fuel consumption rate test the operator starts the device by closing a start switch 35. Current enters the circuit from one side of a source 36 through a normally closed stop switch 37, the start switch 35, a lead 38, a normally closed contact 39 of a relay 40, a lead 41 to a return coil 42 of a stepping relay 43 and through leads 44, 45 and 46 to the opposite side of the source 36. The stepping relay 43 has a series of contacts 47, one of which corresponds to and is connected to each of the contacts of the selector switch 32. The stepping relay also has a zero contact 48 and a home contact 49.

Energization of the stepping relay return coil removes a spring-held pawl 50 from behind ratchet teeth 51 of a spring-urged contact arm 52 of the stepping relay 43 which arm returns to its home position and makes contact with the stepping relay home contact 49. Current then flows from the start switch 35, through the lead 38, the contact 49, the contact arm 52, a lead 53, a lead 54, a normally closed contact 55 of a relay 56, a lead 57 and a lead 58, and then through the coils of the relay 40 and a relay 59 connected in parallel therewith and leads 60 and 61 respectively to the lead 46 and the opposite side of the source. This energizes the relay 40 and opens its normally closed contact 39 which de-energizes the return coil 42 of the stepping relay. Energization of the relay 40 also closes a normally open contact 62 thereof and current now flows from the stop switch 37, through a lead 63, the contact 62, a lead 64, the lead 53 and the lead 54, the contact 55, the leads 57 and 58 and the coils of the relays 40 and 59 and then the leads 60, 61 and 46 to the opposite side of the line, thus forming a hold-in circuit for the relays 40 and 59 so that the operator may release the start switch 35.

At the time the main switch of the circuit was originally closed, current entered the circuit to energize the lamp 20 through the lead 46, a lead 65 and a lead 66 to the lamp 20, and then through a lead 67 and a lead 68, which is connected outside of the start and stop switches 35 and 37, to the opposite side of the source 36. Current entering the device through the leads 65 and 68 also energizes a photoelectric cell amplifier 69 which, since it may be of conventional design, is not herein described in detail.

Energization of the coil of the relay 59 closes its normally open contact 70 and current flows from the lead 68, through the contact 70 and a lead 71 to the coil of the solenoid operated valve 31 and then the lead 46 to the opposite side of the source from that to which the lead 68 is connected. This closes the solenoid controlled valve 31 and stops any fuel from entering the scale tank.

Since there is slightly more than 50 pounds of fuel in the tank the engine continues to run until it has consumed a sufficient amount of such fuel to cause the paddle-wheel indicator 13 to rotate far enough so that the pointer 14 is in line with the "0" indicium of the series 16 and the leading edge of that one of the paddles 18 marked "0" covers the slot 23 in the screen 24. When this occurs, light is cut off from the photoelectric cell 19 and the photoelectric amplifier 69, which has up to this time held open a control contact 72, de-energizes the coil controlling such contact and permits it to close. Current can then flow through the lead 63, the contact 62, the lead 64, the contact 72 and a lead 73 to an index coil 74 of the stepping relay 43 and the leads 45 and 46 to the source 36. Energization of the index coil 74 operates a pawl 75 to advance the contact arm 52 of the stepping relay from its home contact 49 to its zero contact 48. Closure of the contact 48 permits current to flow from one side of the source and the lead 63, the contact 62, the lead 64, the lead 53, the contact arm 52 to the contact 48, a lead 76, the coil of a relay 77 and a lead 78 to the lead 46 and the opposite side of the source. Energization of the relay 77 closes its normally open contacts 79 and 80. Closure of the contact 79 establishes a hold-in circuit for the relay 77 from the lead 53, through the lead 54, the contact 79 and a lead 81 to the lead 76, through the coil of the relay 77 and the lead 78 to the lead 46. This maintains the relay 77 in energized condition even after the contact arm 52 of the stepping relay leaves the zero contact 48. Closure of the contact 80 permits current to flow from the lamp lead 67, through the contact 80 and a lead 82 to the chronometer 33 and revolution counter 34 and then the lead 46. This starts the chronometer and revolution counter which commence to measure the lapse of time and number of revolutions from the instant at which the quantity of gasoline in the scale tank weighed 50 pounds.

As the gasoline is further consumed, the paddle-wheel indicator 13 turns further in a clockwise direction and the "0" paddle is removed from between the lamp 20 and the photoelectric cell 19. This illuminates the photoelectric cell, and its amplifier 69 re-energizes the coil controlling the contact 72 which opens this contact and breaks the circuit described above, to the index coil 74 of the stepping relay 43 releasing the pawl 75 and permitting it to return to driving position.

The engine continues to consume fuel from the scale tank 26 until that one of the paddles 18 associated with 2 pounds intercepts the light rays to the photoelectric cell 19. This permits the contact 72 to close, energizing the index coil 74 and indexing the stepping relay contact arm 52 to that one of the contacts 47 connected to the 2 pound contact of the selector switch 32. However, since the selector switch is not set in this position, no further circuit is established. As the engine continues to consume fuel the successive ones of the paddles 18 corresponding, for example, to 5 pounds, 7 pounds, 10 pounds, 12 pounds, etc., pass by and intercept the light to the photoelectric cell thus indexing the stepping relay one step further from each of such interruptions.

When the engine has consumed 20 pounds of fuel (or, in case the selector switch is set for another quantity of fuel when the engine has consumed such quantity), and that one of the paddles 18 corresponding thereto has reached a position to intercept the light falling on the photoelectric cell 19, the contact arm of the stepping relay makes contact with that one of its contacts 47 which is connected to the 20 pound contact of the selector switch 32 (at which the selector switch 32 is assumed to be set). Current then flows from the source 36, through the lead 63, contact 62, leads 64 and 53, contact arm 52, that one of the contacts 47 corresponding to 20 pounds, the 20 pound contact of the selector switch 32, the selector switch 32, and a lead 83 to the coil of the relay 56 and then to the lead 46 and the other side of the line. This energizes the relay 56 and breaks its normally closed contact 55. This interrupts the circuit by which current is flowing from one side of the source, through the stop switch 37, the lead 63, the contact 62, the lead 64, the lead 53, the lead 54, the contact 55, the leads 57 and 58 and the coils of the relays 40 and 59 and their respective leads 60 and 61 to the lead 46 and the opposite side of the line, thus de-energizing the relays 40 and 59. This opens the contact 62, breaking the hold-in circuit for the relay 40 which passes through the contact 55, and the circuit from such contact through the leads 64, 53 and 54, the contact 79, the leads 81 and 76 and the coil of the relay 77 to the leads 78 and 46. This de-energizes the relay 77 and opens its contacts 79 and 80. Opening of the contact 80 stops the chronometer 33 and revolution counter 34 thus registering the elapsed time and number of revolutions of the engine for the consumption of the 20 pounds of fuel.

The de-energization of the relay 59 de-energizes the solenoid valve 31 which opens and, since the level of the fuel in the scale tank 26 is now lower than the point at which the float valve 29 maintains it, this valve is open and fuel enters the tank.

De-energization of the relay 40 has also permitted its normally closed contact 39 to close which sets the device for the next test. The operator records the time and revolutions of the past test and sets the selector switch 32 to the proper amount of fuel for the successive test. The fuel under control of the float valve 29 enters the tank until it reaches a quantity slightly more than 50 pounds and the paddle-wheel indicator 13 returns to the position shown in Fig. III.

If, for any reason, it is desired to stop the operation of the device prior to the completion of a test, this may be accomplished by opening the stop switch 37 which is between the main power lead 63 and the source of current 36.

The embodiment of the invention that has been disclosed may be modified to meet various requirements.

Having described the invention, I claim:

1. In a device of the class described, in combination, a lever system, load counterbalancing mechanism connected thereto, an indicator operatively connected to said load counterbalancing mechanism, a receptacle for material to be consumed during test, said receptacle being supported by said lever system, automatic means for maintaining a specified quantity of material in said receptacle, manually settable means having a plurality of positions corresponding to quantities of material each less than such specified quantity, to be consumed during tests, an electrically operated control for deactivating said automatic means during tests, a device actuated by said indicator upon consumption of material from said receptacle during tests, electrically operated time and operation registering means, means including a manually operable switch for instigating operation of said electrically operated control and conditioning said device to control said electrically operated time and operation registering means, and electrical means connecting said electrically operated control, said device, said manually settable means and said electrically operated time and operation registering means, whereby upon consumption of a quantity of material equal to the quantity selected by said manually settable means said automatic means is reactivated and said electrically operated time and operation registering means register the time and operation during such consumption.

2. In apparatus for controlling the measurement of the fuel consumption of an internal combustion engine under test, in combination, a lever system, a tank supported by said lever system, an automatic valve for maintaining the fuel in said tank at a selected quantity, a conduit from said tank to said engine, load counterbalancing mechanism and an indicator operatively connected to said lever system, a manually operable quantity selector switch having a plurality of successive positions each corresponding to a selected quantity of fuel, a light source and photoelectric means on opposite sides of the path of movement of said indicator, said indicator having a series of light-interrupting vanes corresponding to the positions of said selector switch, an electrically operated valve for rendering said automatic valve nonoperative, an electrically controlled registering revolution counter and chronometer and electrical means including a manually operable switch connecting said photoelectric means, said quantity selector switch, said electrically operated valve and said revolution counter and chronometer for instigating measured consumption of fuel by said engine and operation of said revolution counter and said chronometer at the start of a test and for stopping measured consumption of fuel when that one of the vanes on said indicator which corresponds to the quantity of fuel selected on said selector switch interrupts the light from said light source to said photoelectric means.

3. In a fuel consumption testing apparatus, in combination, a lever system, a fuel tank supported by said lever system, a fuel line from said tank to a fuel consuming device under test, load counterbalancing mechanism operatively connected to said lever system, an indicator operated by said load counterbalancing mechanism, said indicator comprising a pointer and a series of vanes, each vane corresponding to a specific quantity of fuel to be consumed under test, a manually positionable selector switch having a series of positions corresponding to said vanes, electrically actuated information registering devices, a light source and photoelectric means located on opposite sides of the path of movement of said indicator vanes, and electrical means interconnecting said photoelectric means, said electrically actuated information registering devices and said selector switch for starting measured consumption of fuel and said registering devices at the beginning of a test and for stopping measured consumption of fuel and said registering devices when that one of said indicator vanes corresponding to the quantity of fuel selected on said selector switch passes between said light source and said photoelectric means.

4. In apparatus for controlling the measurement of the fuel consumption of an internal combustion engine under test, in combination, a lever system, a fuel tank supported by said lever system, load counterbalancing and indicating mechanism, a selector switch having a plurality of positions each corresponding to a different quantity of fuel to be consumed, an electrically controlled registering chronometer and revolution counter, and electrical means interconnected with said selector switch and actuated by said load counterbalancing and indicating mechanism for controlling said chronometer and revolution counter for registering elapsed time and total revolutions of such engine for the consumption of a quantity of fuel selected on said selector switch.

5. In a weighing scale for controlling the measurement of the time of withdrawal of selected quantities of materal, in combination, a lever system, a material supply container supported by said lever system, load counterbalancing mechanism, an indicator operatively connected to said load counterbalancing mechanism, said indicator having a plurality of spaced actuating members, each of said members corresponding to a different quantity of material to be withdrawn, control means actuatable by said actuating members and located near the path of movement of said indicator, a manually operable selector switch having a plurality of positions each corresponding to one of said actuating members, and electrical means interconnecting said selector switch and said control means for controlling the measurement of the time of withdrawal of material from said supply container as a quantity of material selected on said selector switch is being withdrawn therefrom.

6. In a device of the class described, in combination, a lever system, a receptacle for material to be consumed during a test, said receptacle being supported by said lever system, load counterbalancing mechanism operatively connected to said lever system, an indicator operatively connected to said load counterbalancing mechanism, a selector switch for establishing quantities of material to be consumed during a test, electrically operated registering equipment and electrical means actuated by said indicator for energizing said electrically operated registering equipment during the time interval said established quantity of material is being consumed.

7. In apparatus for testing fuel consumption, in combination, a lever system, a fuel tank supported by said lever system, load counterbalancing mechanism operatively connected to said lever system, automatic means for maintaining a specified quantity of fuel in said tank, an indicator operatively attached to said load counterbalancing mechanism, electrical control and registering means including photoelectric means actuated by said indicator, a selecting switch having a plurality of positions each corresponding to a quantity of fuel less than the specified quantity maintained in said tank by said automatic means, an electrically actuated registering revolution counter, an electrically actuated registering chronometer, an electrically actuated valve for rendering said automatic means ineffectual, a manually operable switch for conditioning said electrical control means to start a test, and electrical means responsive to actuation of said photoelectric means and connecting said control and registering means, said selecting switch, said electrically actuated valve, said revolution counter, and said chronometer whereby the measurement of the time of consumption of a quantity of fuel selected by said selecting switch is started and stopped by said indicator cooperating with said photoelectric means and fuel to replace that consumed is admitted into said tank, said chronometer and revolution counter registering the time of operation and the number of revolutions made by the fuel consuming device being tested during the consumption of a selected quantity of fuel.

MARK A. WECKERLY.